United States Patent
Sidelkovskiy et al.

(12) United States Patent (10) Patent No.: US 11,585,294 B2
(45) Date of Patent: Feb. 21, 2023

(54) HIGH BYPASS RATIO ENGINE BYPASS DUCT NOZZLE WITH CONTROLLED NOZZLE AREA

(71) Applicant: Raytheon Technologies Corporation, Farmington, CT (US)

(72) Inventors: Dmitriy B. Sidelkovskiy, Ellington, CT (US); Steven H. Zysman, Amston, CT (US); Nathan L. Messersmith, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 85 days.

(21) Appl. No.: 16/797,236

(22) Filed: Feb. 21, 2020

(65) Prior Publication Data

US 2021/0262415 A1 Aug. 26, 2021

(51) Int. Cl.
*F02K 3/06* (2006.01)
*F02K 1/09* (2006.01)
*F02K 1/12* (2006.01)
*F02K 3/075* (2006.01)

(52) U.S. Cl.
CPC ............ *F02K 3/06* (2013.01); *F02K 1/09* (2013.01); *F02K 1/1207* (2013.01); *F02K 3/075* (2013.01); *F05D 2220/323* (2013.01); *F05D 2220/36* (2013.01); *F05D 2240/128* (2013.01); *F05D 2250/323* (2013.01); *F05D 2250/324* (2013.01)

(58) Field of Classification Search
CPC ... F02K 3/06; F02K 3/075; F02K 1/09; F02K 1/1207; F05D 2220/323; F05D 2220/36; F05D 2240/128; F05D 2250/323; F05D 2250/324
See application file for complete search history.

(56) References Cited

U.S. PATENT DOCUMENTS

| 4,784,326 A | * | 11/1988 | Honeycutt, Jr. | ...... F02K 1/1292 244/216 |
| 10,197,008 B2 | | 2/2019 | Roberge | |
| 10,371,092 B2 | | 8/2019 | Sidelkovskiy et al. | |
| 2010/0050595 A1 | | 3/2010 | Migliaro, Jr. et al. | |

(Continued)

OTHER PUBLICATIONS

European Search Report for European Application No. 21158446.1, International Filing Date: Feb. 2, 2021, dated Jul. 16, 2021.

*Primary Examiner* — Craig Kim
(74) *Attorney, Agent, or Firm* — Cantor Colburn LLP (57) ABSTRACT

A nacelle assembly of a gas turbine engine includes an annular structure defining a central axis, and having a radially inward surface and a radially outward surface, the radially inward surface at least partially defining a bypass duct. An aft portion of the radially inward surface at least partially defines an axially extending convergent-divergent exit nozzle. A secondary nozzle flap is radially spaced from the aft portion of the radially inward surface. The secondary nozzle flap and the aft portion of the radially inward surface define a secondary bypass duct therebetween. The secondary nozzle flap is operably connected to the annular structure such that the secondary nozzle flap is selectably movable relative to the aft portion of the radially inward surface, thereby changing a cross-sectional area of a secondary bypass duct exit.

16 Claims, 7 Drawing Sheets

(56) References Cited

U.S. PATENT DOCUMENTS

| | | | |
|---|---|---|---|
| 2014/0026536 A1* | 1/2014 | Gormley | F02K 1/09 |
| | | | 239/265.19 |
| 2015/0000305 A1* | 1/2015 | Jasklowski | F02K 1/18 |
| | | | 60/722 |
| 2016/0010590 A1* | 1/2016 | Rolt | F02C 3/04 |
| | | | 60/805 |
| 2017/0298870 A1* | 10/2017 | Boileau | F02K 1/763 |
| 2018/0245539 A1 | 8/2018 | Todorovic | |
| 2018/0245540 A1* | 8/2018 | Todorovic | F02K 1/12 |
| 2019/0017470 A1 | 1/2019 | Sidelkovskiy et al. | |
| 2021/0222647 A1* | 7/2021 | Colebrooke | F02K 1/1207 |

* cited by examiner

HIGH BYPASS RATIO ENGINE BYPASS DUCT NOZZLE WITH CONTROLLED NOZZLE AREA

BACKGROUND

The present disclosure relates generally to bypass duct exhaust nozzles for a gas turbine engine, and more specifically to a convergent divergent exit nozzle for the same.

Turbofan engines, such as those used in commercial aircraft, include a fan driven by a shaft. The fan draws air into a compressor portion and a bypass duct. The compressor portion compresses the air and provides the compressed air to a combustor. The air is mixed with fuel and combusted within the combustor. The resultant combustion gasses are expelled from the combustor into a turbine, and expand through the turbine driving the turbine to rotate. At least a portion of the turbine is connected with the shaft and provides rotational force driving the fan to rotate. The air drawn into the bypass duct bypasses the compressor, combustor, and turbine and is expelled from the bypass duct at a bypass duct convergent-divergent exit nozzle.

BRIEF DESCRIPTION

In one embodiment, a nacelle assembly of a gas turbine engine includes an annular structure defining a central axis, and having a radially inward surface and a radially outward surface, the radially inward surface at least partially defining a bypass duct. An aft portion of the radially inward surface at least partially defines an axially extending convergent-divergent exit nozzle. A secondary nozzle flap is radially spaced from the aft portion of the radially inward surface. The secondary nozzle flap and the aft portion of the radially inward surface define a secondary bypass duct therebetween. The secondary nozzle flap is operably connected to the annular structure such that the secondary nozzle flap is selectably movable relative to the aft portion of the radially inward surface, thereby changing a cross-sectional area of a secondary bypass duct exit.

Additionally or alternatively, in this or other embodiments an actuator is operably connected to the secondary nozzle flap and positioned in the annular structure and is configured to drive movement of the secondary nozzle flap.

Additionally or alternatively, in this or other embodiments the actuator is one of an electrical or hydraulic actuator.

Additionally or alternatively, in this or other embodiments a leading edge of the secondary nozzle flap is radially offset from a trailing edge of the secondary nozzle flap, relative to the central axis.

Additionally or alternatively, in this or other embodiments the secondary nozzle flap includes a radially outward flap surface having one or more undulations or protrusions.

Additionally or alternatively, in this or other embodiments a roller track is located at the annular structure, and a roller is configured to travel along the roller track. The secondary nozzle flap is operably connected to the roller such that driving the roller along the roller track guides movement of the secondary nozzle flap.

In another embodiment, a gas turbine engine includes an engine core, a fan operably connected to the engine core and driven by the engine core, and a nacelle surrounding the engine core and the fan and defining a bypass duct between the nacelle and the engine core. The nacelle includes an annular structure defining a central axis, and having a radially inward surface and a radially outward surface, the radially inward surface and the engine core defining the bypass passage. An aft portion of the radially inward surface at least partially defines an axially extending convergent-divergent exit nozzle. A secondary nozzle flap is radially spaced from the aft portion of the radially inward surface. The secondary nozzle flap and the aft portion of the radially inward surface defining a secondary bypass duct therebetween, the secondary nozzle flap are operably connected to the annular structure such that the secondary nozzle flap is selectably movable relative to the aft portion of the radially inward surface, thereby changing a cross-sectional area of a secondary bypass duct exit.

Additionally or alternatively, in this or other embodiments an actuator is operably connected to the secondary nozzle flap and located in the annular structure and is configured to drive movement of the secondary nozzle flap.

Additionally or alternatively, in this or other embodiments the actuator is one of an electrical or hydraulic actuator.

Additionally or alternatively, in this or other embodiments a leading edge of the secondary nozzle flap is radially offset from a trailing edge of the secondary nozzle flap, relative to the central axis.

Additionally or alternatively, in this or other embodiments the secondary nozzle flap includes a radially outward flap surface having one or more undulations or protrusions.

Additionally or alternatively, in this or other embodiments a roller track is located at the annular structure, and a roller is configured to travel along the roller track. The secondary nozzle flap is operably connected to the roller such that driving the roller along the roller track guides movement of the secondary nozzle flap.

In yet another embodiment, a method of operating a gas turbine engine includes defining a bypass duct of the gas turbine engine between a core of the gas turbine engine and a nacelle located radially outboard of the core. An aft portion of the radially inward surface at least partially defines an axially extending convergent-divergent exit nozzle. A secondary nozzle flap is positioned radially spaced from the aft portion of the radially inward surface, the secondary nozzle flap and the aft portion of the radially inward surface defining a secondary bypass duct therebetween. The secondary nozzle flap is selectably moved relative to the aft portion of the radially inward surface, thereby changing a cross-sectional area of a secondary bypass duct exit.

Additionally or alternatively, in this or other embodiments the secondary nozzle flap is selectably movable on one or more of an axial direction or a radial direction.

Additionally or alternatively, in this or other embodiments the secondary nozzle flap is driven by an actuator located in the annular structure.

Additionally or alternatively, in this or other embodiments the actuator is one of an electrical or hydraulic actuator.

Additionally or alternatively, in this or other embodiments a leading edge of the secondary nozzle flap is radially offset from a trailing edge of the secondary nozzle flap, relative to the central axis.

Additionally or alternatively, in this or other embodiments the secondary nozzle flap includes a radially outward flap surface having one or more undulations or protrusions.

Additionally or alternatively, in this or other embodiments a roller track is located at the annular structure, and a roller is driven along the roller track. The secondary nozzle flap is operably connected to the roller such that driving the roller along the roller track guides movement of the secondary nozzle flap.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
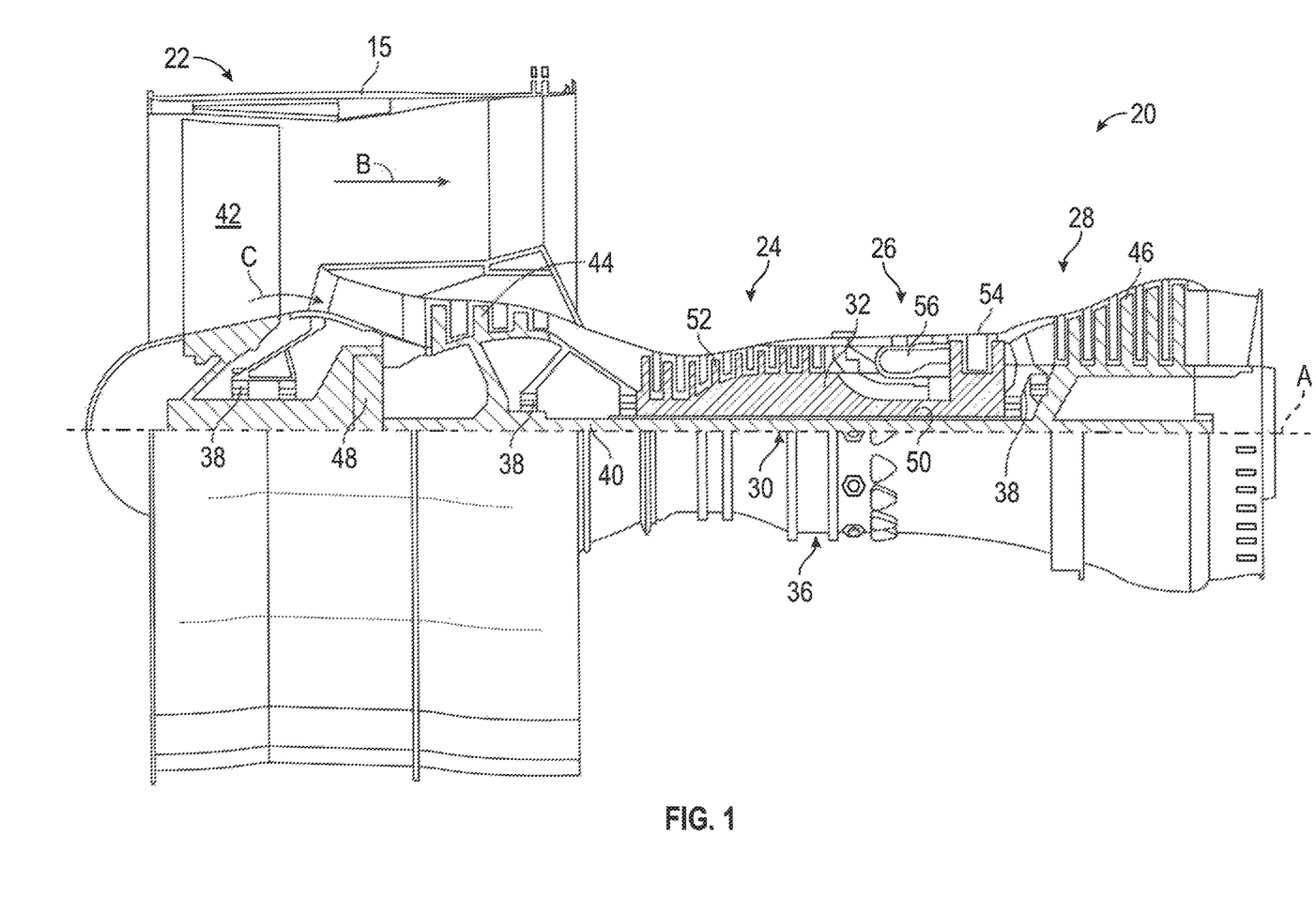
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is optimized for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 m/sec).

Figure 2:
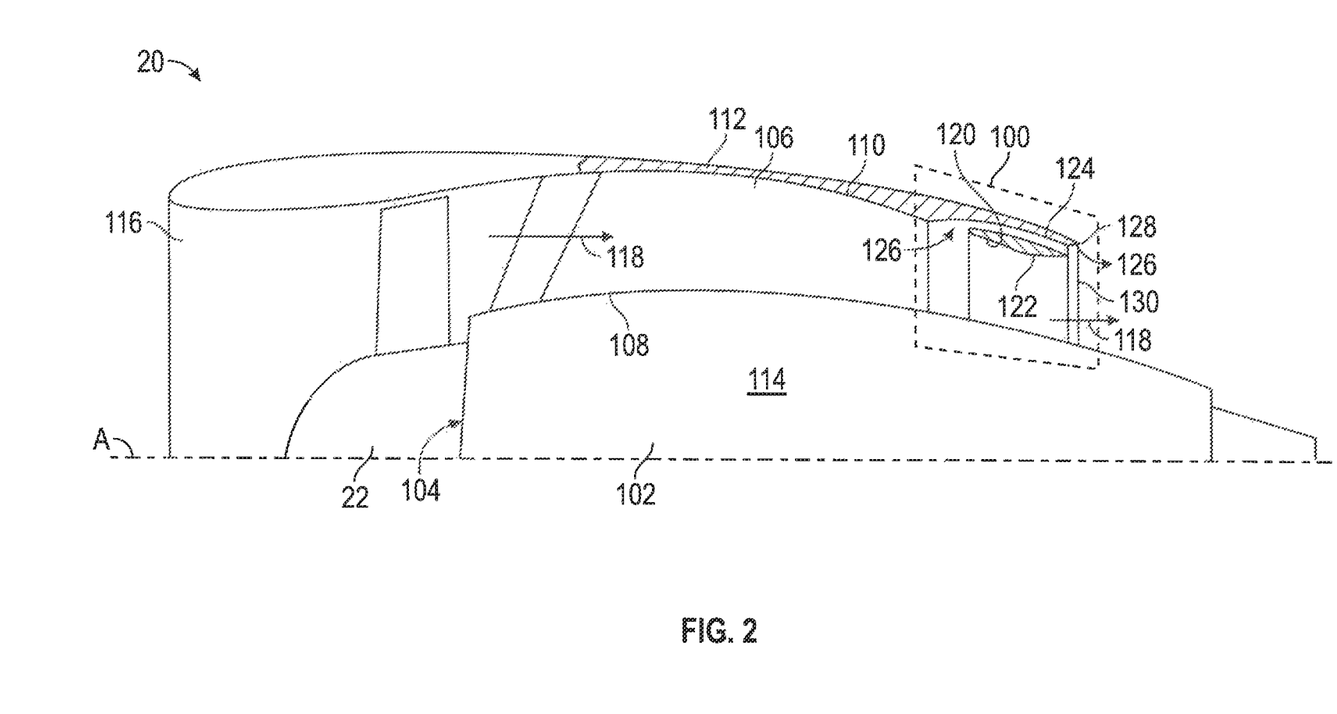
FIG. 2 is a partial cross-sectional view of an embodiment of a bypass passage of a gas turbine engine.

FIG. 2 schematically illustrates an embodiment of a gas turbine engine 20, including a convergent-divergent exit nozzle 100. Each of the compressor section 24, the combustor section 26 and the turbine section 28 (described above and illustrated in FIG. 1) are contained within an engine core 102. The fan section 22 is positioned forward of a fluid inlet 104 to the engine core 102 and pushes air into the engine core 102 and into a bypass duct 106. The bypass duct 106 is defined between an inner surface 108 and an outer surface 110 of the bypass duct 106. The bypass duct outer surface 110 is formed by an inner surface of a nacelle 112. In some examples, the inner surface 108 is formed by an outer surface of a core cowl 114 enclosing the engine core 102. Air enters the bypass duct 106 at an airflow inlet 116 and exits the bypass duct 106 at the exit nozzle 100. The exit nozzle 100 is positioned at an aft end of the bypass duct 106, relative to a direction of fluid flow 118 through the bypass duct 106.

The exit nozzle 100 is a convergent-divergent exit nozzle. At a convergent region 120 of the exit nozzle 100, the outer surface 110 of the bypass duct 106 converges toward the inner surface 108. At a divergent region 122 of the exit nozzle 100, the outer surface 110 of the bypass duct 106 diverges away from the inner surface 108. The particular magnitude of the convergence or the divergence in the convergent-divergent exit nozzle 100 depends on the specifics of the gas turbine engine 20 and can be determined by one of skill in the art having the benefit of this disclosure. Similarly, one of skill in the art, having the benefit of this disclosure, will understand that convergent-divergent exit nozzles 100 provide beneficial flow control for the bypass duct 106 relative to non-convergent-divergent nozzles.

In order to reduce the flow separation at the divergent region 122, the bypass duct 106 includes a secondary duct 124, alternately referred to as a secondary passage. A secondary flowpath 126 branches from the bypass airflow 118 and enters the secondary duct 124 in the convergent region 120. The secondary duct 124 passes through the body of the engine nacelle 112 and exits at a secondary duct convergent-divergent exit nozzle 128 positioned in the divergent region 122, and axially upstream of an exit nozzle 130 of the bypass duct 106 relative to the axis A defined by the gas turbine engine 20.

Figure 3:
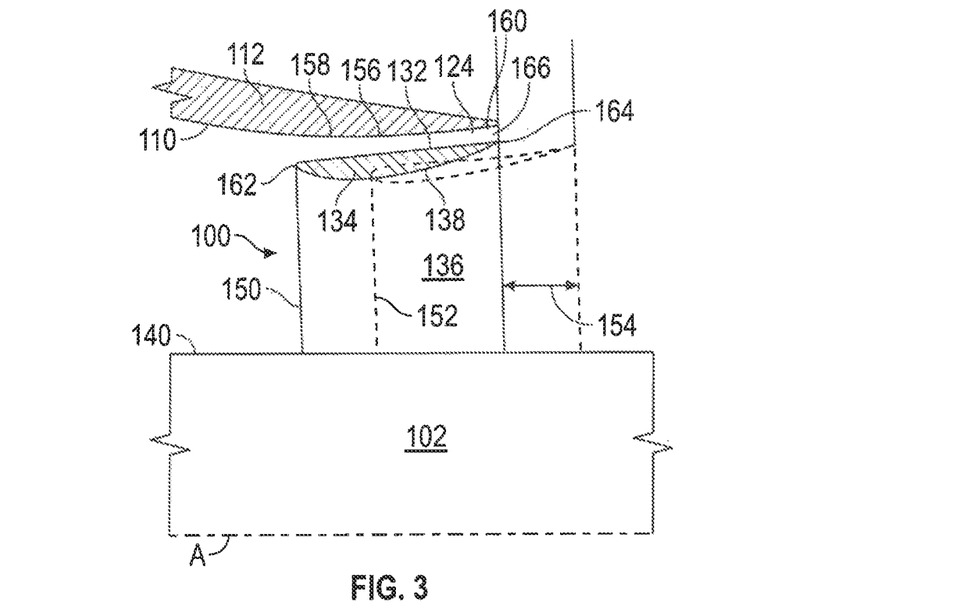
FIG. 3 is a partial cross-sectional view of an embodiment of a bypass passage with a moveable secondary nozzle flap.
Figure 4:
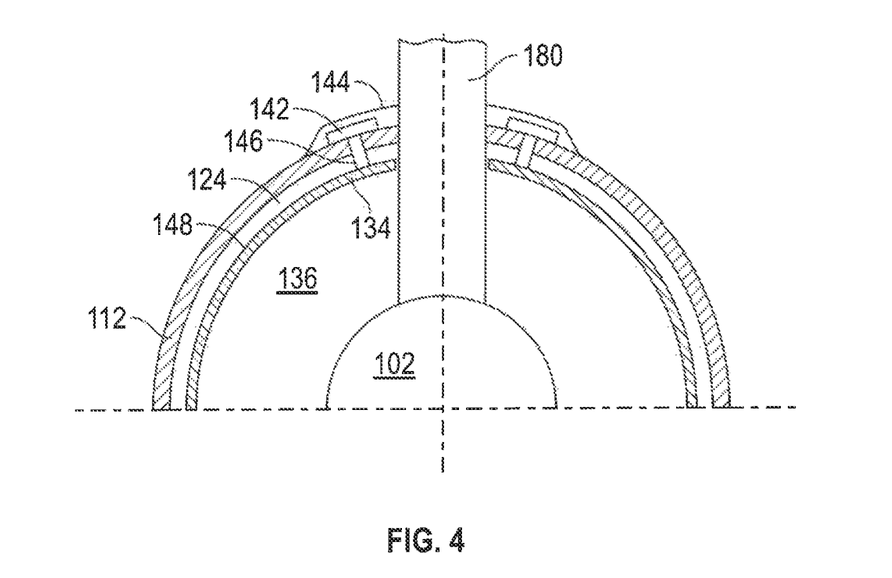
FIG. 4 is a partial axial cross-sectional view of an embodiment of a bypass passage of a gas turbine engine.

Referring to FIG. 3, the secondary duct 124 portion of the bypass duct 106 is defined between the outer surface 110 defined by the inner nacelle surface 156 of the nacelle 112, and an outer flap surface 132 of a secondary nozzle flap 134, while a primary duct 136 portion of the bypass duct 106 is defined between an inner flap surface 138 of the secondary nozzle flap 134 and the outer core cowl surface 140. The secondary nozzle flap 134 is movable along a direction parallel to axis A. In some embodiments, as shown in FIG. 4, the secondary nozzle flap 134 is connected to an actuator 142 located in the engine nacelle 112 arranged around pylon 180, and/or located at the engine nacelle 112 in an actuator fairing 144. The actuator 142 may be, for example, an electrical or hydraulic actuator 142 and is connected to the nozzle flap 134 via an actuator linkage 146 extending across the secondary duct 124 from the actuator 142 to the nozzle flap 134. In some embodiments, the nozzle flap 134 is formed from a plurality of circumferential flap segments 148, with one or more actuators 142 each connected to one or more flap segments 148.

Referring again to FIG. 3, activation of the actuator 142 moves the nozzle flap 134 along the axial direction between an axially stowed position shown as 150 and an axially extended position shown as 152. The axial difference between the axially stowed position 150 and the axially extended position 152 is a nozzle flap stroke 154. In the embodiment of FIG. 3, along the secondary duct 124 the inner nacelle surface 156 and the outer flap surface 132 are tilted relative to axis A such that as the inner nacelle surface 156 extends axially downstream it has an increasing radial distance from central axis A. Stated another way, at an upstream nacelle end 158 the inner nacelle surface 156 is nearer central axis A than at a downstream nacelle end 160. Similarly, the nozzle flap 134 is positioned such that an upstream flap end 162 is radially nearer the central axis A than is a downstream flap end 164. Thus, as the nozzle flap 134 is driven by the actuator 142 axially from the axially extended position 152 toward the axially stowed position 150 a secondary duct cross-sectional area 166 decreases.

Figure 5:
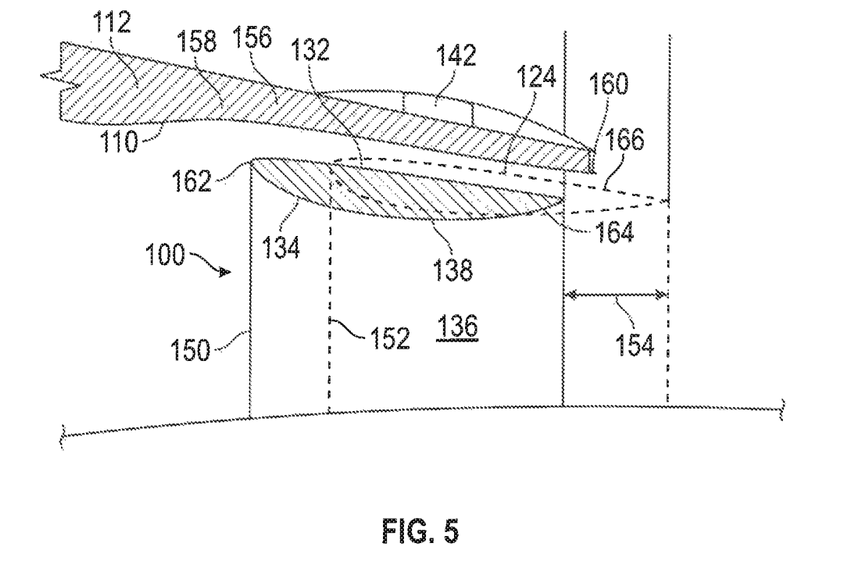
FIG. 5 is a partial cross-sectional view of another embodiment of a bypass passage with a moveable secondary nozzle flap.

Is another embodiment, as shown in FIG. 5, at the upstream nacelle end 158 the inner nacelle surface 156 is farther from the central axis A than at the downstream nacelle end 160. Similarly, the nozzle flap 134 is positioned such that an upstream flap end 162 is radially farther from the central axis A than is the downstream flap end 164. Thus, as the nozzle flap 134 is driven by the actuator 142 axially from the axially extended position 152 toward the axially stowed position 150 the secondary duct cross-sectional area 166 increases.

Figure 6:
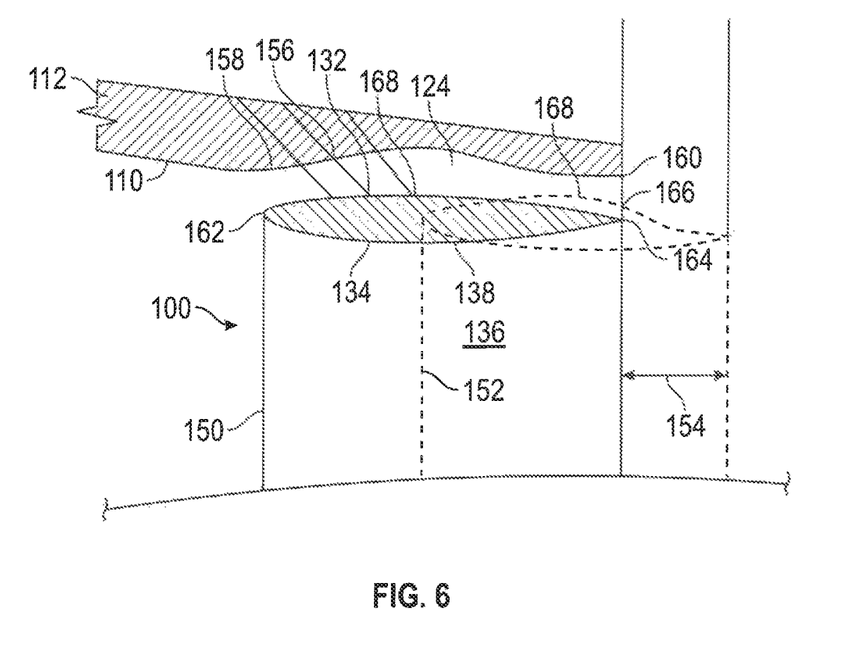
FIG. 6 is a partial cross-sectional view of yet another embodiment of a bypass passage with a moveable secondary nozzle flap.

Referring now to FIG. 6, in some embodiments one or more of the inner nacelle surface 156 and the outer flap surface 132 are contoured, having one or more convex protrusions 168. In the embodiment of FIG. 6, the outer flap surface 132 includes protrusion 168, such that when the nozzle flap 134 is driven by the actuator 142 axially from the axially stowed position 150 toward the axially extended position 152 the secondary duct cross-sectional area 166 decreases.

Figure 7:
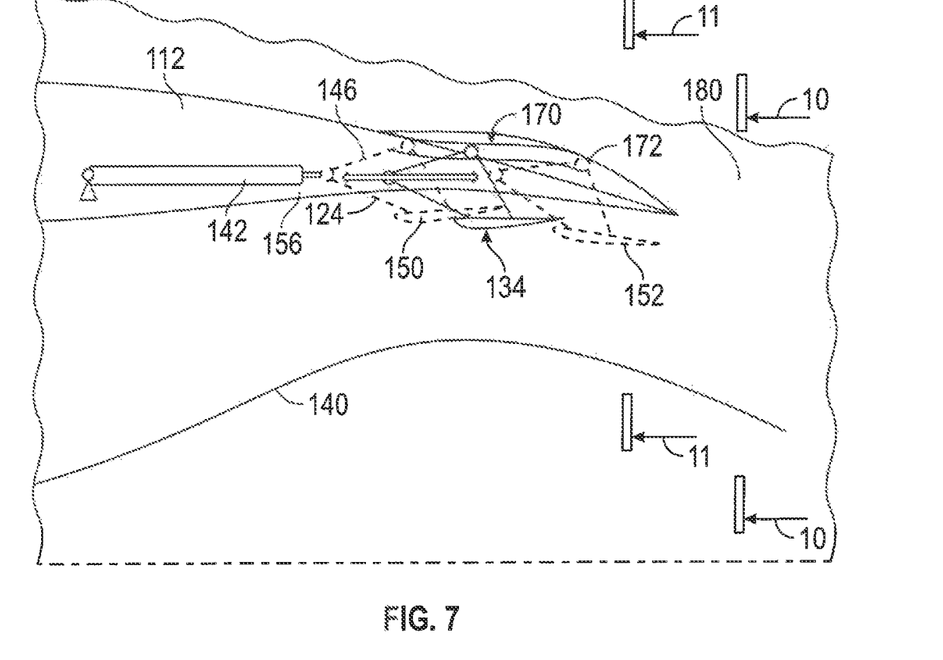
FIG. 7 is a partial cross-sectional view of an embodiment of a bypass passage with a moveable secondary nozzle flap via a roller track.
Figure 8:
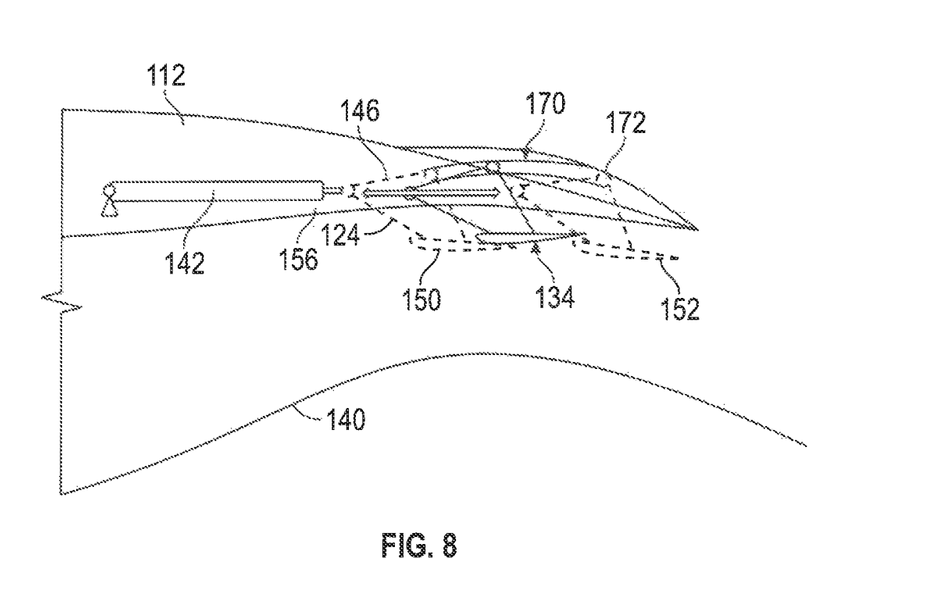
FIG. 8 is a partial cross-sectional view of another embodiment of a bypass passage with a moveable secondary nozzle flap via a roller track.
Figure 9:
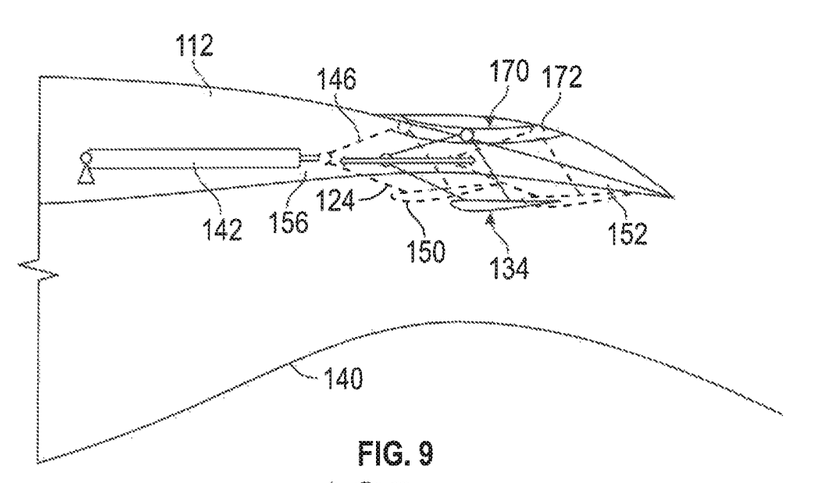
FIG. 9 is a partial cross-sectional view of yet another embodiment of a bypass passage with a moveable secondary nozzle flap via a roller track.

Referring now to FIGS. 7, 8, and 9, in some embodiments the nozzle flap 134 is driven by the actuator 142 such that the nozzle flap 134 moves in a combination of the axial direction and the radial direction, as it is driven between the axially stowed position 150 and the axially extended position 152. Referring in particular to FIG. 7, a roller track 170 is disposed in the nacelle 112, with the nozzle flap 134 connected to a roller 172 that travels along the roller track 170. In some embodiments, the nozzle flap 134 is connected to the roller 172 via the actuator linkage 146, which may also be operably connected to the actuator 142. When the actuator 142 is activated, the nozzle flap 134 is driven between the axially stowed position 150 and the axially extended position 152 along a path taking the shape of the roller track 170. In FIG. 7, for example, the roller track 170 has an undulating path, and thus the nozzle flap 134 is driven along such an undulating path.

Other exemplary embodiments are illustrated in FIGS. 8 and 9. In the embodiment of FIG. 8, for example, the roller track 170 has a concave path, relative to the central axis A, and in FIG. 9, for example, the roller track 170 has a convex shape relative to the central axis A.

Figure 10:
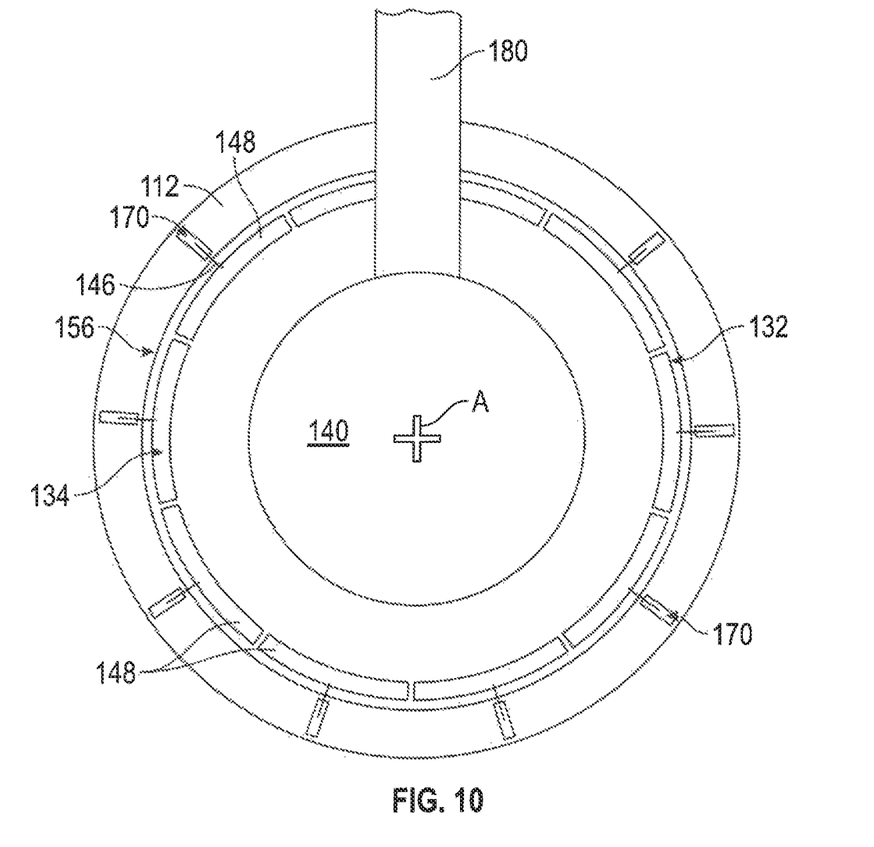
FIG. 10 is an aft looking forward cross-sectional view of an embodiment of a bypass passage with a moveable secondary nozzle at the extended position.
Figure 11:
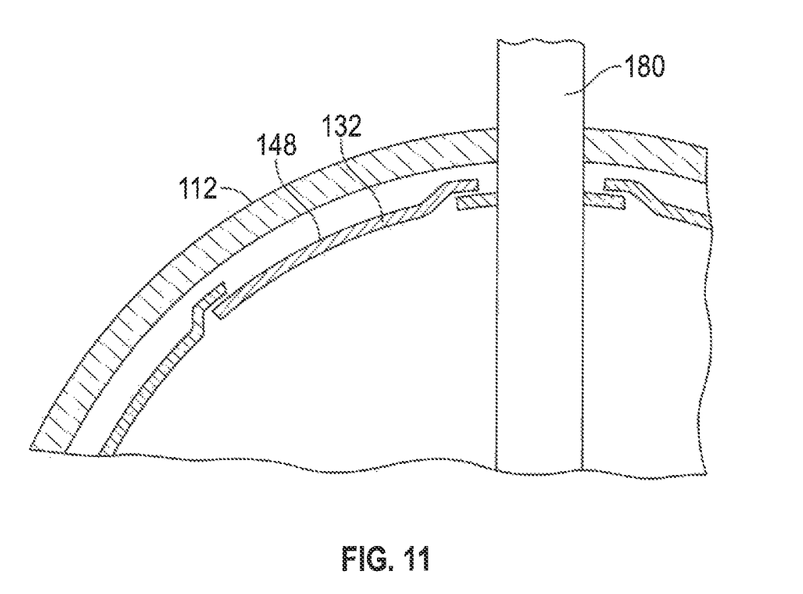
FIG. 11 is another aft looking forward cross-sectional view of an embodiment of a bypass passage with a moveable secondary nozzle at the extended position.

Referring now to FIGS. 10 and 11, the nozzle flap 134 is illustrated in the axially extended position 152, or cruise condition. Specifically regarding FIG. 10, the nozzle flap 134 is formed from a plurality of circumferential nozzle flap segments 148 arranged around the central axis A. Each nozzle flap segment 148 is connected to a roller track 170 located in the nacelle 112 via a linkage 146. As illustrated in FIG. 11, circumferentially adjacent flap segments 148 may overlap, thus providing a circumferentially continuous flap outer surface 132.

It is to be appreciated that the illustrated embodiments are merely exemplary and the nozzle flap 134 may be aerodynamically shaped and the roller track 170 geometrically contoured to achieve specific performance and integration objectives, and may be particular to the shaping of the core cowl 140 and the nacelle 112. Further, the shape of the nozzle flap 134 and the movement thereof allows insurance of selected gas turbine engine 20 performance and efficiency during differing operating conditions to reduce mission fuel consumption and improve gas turbine engine 20 operability.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A nacelle assembly of a gas turbine engine, comprising:
   an annular structure defining a central axis, and having a radially inward surface and a radially outward surface, the radially inward surface at least partially defining a bypass duct;
   an aft portion of the radially inward surface at least partially defining an axially extending convergent-divergent exit nozzle;
   a secondary nozzle flap radially spaced from the aft portion of the radially inward surface, the secondary nozzle flap and the aft portion of the radially inward surface defining a secondary bypass duct therebetween, the secondary nozzle flap operably connected to the annular structure such that the secondary nozzle flap is selectably movable in a direction along the central axis relative to the aft portion of the radially inward surface, thereby changing a cross-sectional area of a secondary bypass duct;
   wherein one or more of the radially inward surface or a radially outer flap surface include a convex protrusion such that when the nozzle flap is driven from an axially extended position toward an axially stowed position, the cross-sectional area increases.

2. The nacelle assembly of claim 1, further comprising an actuator operably connected to the secondary nozzle flap and disposed in the annular structure configured to drive movement of the secondary nozzle flap.

3. The nacelle assembly of claim 2, wherein the actuator is one of an electrical or hydraulic actuator.

4. The nacelle assembly of claim 1, wherein a leading edge of the secondary nozzle flap is radially offset from a trailing edge of the secondary nozzle flap, relative to the central axis.

5. The nacelle assembly of claim 1, wherein the secondary nozzle flap includes a radially outward flap surface having one or more undulations or protrusions.

6. A gas turbine engine comprising:
   an engine core;
   a fan operably connected to the engine core and driven by the engine core;
   a nacelle surrounding the engine core and the fan and defining a bypass duct between the nacelle and the engine core, the nacelle including:
      an annular structure defining a central axis, and having a radially inward surface and a radially outward surface, the radially inward surface and the engine core defining the bypass passage;
      an aft portion of the radially inward surface at least partially defining an axially extending convergent-divergent exit nozzle; and
   a secondary nozzle flap radially spaced from the aft portion of the radially inward surface, the secondary nozzle flap and the aft portion of the radially inward surface defining a secondary bypass duct therebetween, the secondary nozzle flap operably connected to the annular structure such that the secondary nozzle flap is selectably movable in a direction along the central axis relative to the aft portion of the radially inward surface, thereby changing a cross-sectional area of a secondary bypass duct exit;
   wherein one or more of the radially inward surface or a radially outer flap surface include a convex protrusion such that when the nozzle flap is driven from an axially extended position toward an axially stowed position, the cross-sectional area increases.

7. The gas turbine engine of claim 6, further comprising an actuator operably connected to the secondary nozzle flap and disposed in the annular structure configured to drive movement of the secondary nozzle flap.

8. The gas turbine engine of claim 7, wherein the actuator is one of an electrical or hydraulic actuator.

9. The gas turbine engine of claim 6, wherein a leading edge of the secondary nozzle flap is radially offset from a trailing edge of the secondary nozzle flap, relative to the central axis.

10. The gas turbine engine of claim 6, wherein the secondary nozzle flap includes a radially outward flap surface having one or more undulations or protrusions.

11. A method of operating a gas turbine engine, comprising:
    defining a bypass duct of the gas turbine engine between a core of the gas turbine engine and a nacelle disposed radially outboard of the core, an aft portion of the radially inward surface at least partially defining an axially extending convergent-divergent exit nozzle; and
    positioning a secondary nozzle flap radially spaced from the aft portion of the radially inward surface, the secondary nozzle flap and the aft portion of the radially inward surface defining a secondary bypass duct therebetween,
    selectably moving the secondary nozzle flap in a direction along a central longitudinal axis of the gas turbine engine relative to the aft portion of the radially inward surface, thereby changing a cross-sectional area of a secondary bypass duct exit;

wherein one or more of the radially inward surface or a radially outer flap surface include a convex protrusion such that when the nozzle flap is driven from an axially extended position toward an axially stowed position, the cross-sectional area increases.

12. The method of claim 11, wherein the secondary nozzle flap is selectably movable on one or more of an axial direction or a radial direction.

13. The method of claim 11, wherein the secondary nozzle flap is driven by an actuator disposed in the annular structure.

14. The method of claim 13, wherein the actuator is one of an electrical or hydraulic actuator.

15. The method of claim 11, wherein a leading edge of the secondary nozzle flap is radially offset from a trailing edge of the secondary nozzle flap, relative to the central axis.

16. The method of claim 11, wherein the secondary nozzle flap includes a radially outward flap surface having one or more undulations or protrusions.

* * * * *